Patented Jan. 19, 1932

1,841,457

UNITED STATES PATENT OFFICE

KARL STREITWOLF, OF FRANKFORT-ON-THE-MAIN, ALFRED FEHRLE, OF BAD-SODEN-ON-THE-TAUNUS, AND WALTER HERRMANN AND PAUL FRITZSCHE, OF FRANK-FORT-ON-THE-MAIN-HOECHST, GERMANY, ASSIGNORS TO WINTHROP CHEMICAL COMPANY, INC., OF NEW YORK, N. Y., A CORPORATION OF NEW YORK

AN AROMATIC ARSONIC ACID COMPOUND OF PYRAZOLONE

No Drawing. Application filed August 2, 1929, Serial No. 383,168, and in Germany August 25, 1928.

The present invention relates to condensation products, more particularly to compounds of the following formula:

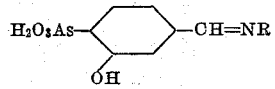

wherein R represents the group

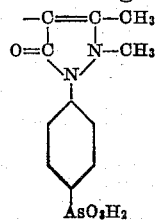

or the group

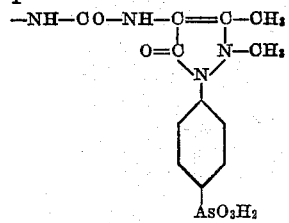

We have found that by causing aldehyde- or ketonaryl-arsonic acids to react with phenylpyrazolone-arsonic acids containing a condensable amino- or hydrazino group, compounds with two arsonic acid residues are formed, which as well as their salts, are distinguished by a slight poisonousness and a good curative power. In consequence thereof these compounds possess an extremely favorable therapeutical index, which makes them fit for use within wide limits of dose. This is an essential advantage for the medical practice.

The following examples serve to illustrate our invention.

(1) 33 g. of 4-amino-2.3-dimethyl-1-phenyl-(para-arsonic acid)-5-pyrazolone, obtained by reduction of the corresponding nitroso-compound or by oxidation of the corresponding arseno compound, are dissolved in 100 ccm. of normal caustic soda solution. Then a hot solution of 29 g. of the sodium salt of 3-hydroxy-benzaldehyde-4-arsonic acid in 150 ccm. of water is added thereto. The solution is boiled, filtered with decolorizing coal, cooled and the resulting 4-(3'-hydroxy-4'-arsonic acid)-benzal-amino-2.3-dimethyl-1-phenyl (para-arsonic acid)-5-pyrazolone is precipitated by means of hydrochloric acid, filtered by suction, washed with water and dried. It forms a pale yellow powder, which does not melt when heated to 300° C. and is readily soluble in alkalies. From a concentrated aqueous solution the salts of this compound are precipitated in a solid form by means of alcohol and ether.

The product has the following formula:

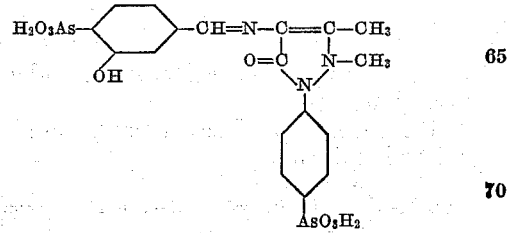

(2) 11.8 g. of 1-phenyl-(para-arsonic acid)-2.3-dimethyl-5-pyrazolone - 4 - semicarbazide, obtained by causing 4-amino-1-phenyl-(para-arsonic acid)-2.3-dimethyl-5-pyrazolone to react with chloro-carbonic acid ethyl ester and heating the resultant carbethoxy-amino compound with hydrazine hydrate, are dissolved in a mixture of 30 ccm. of water and 16 ccm. of 2/n caustic soda solution, and added to a solution of 8.6 g. of the sodium salt of 3-hydroxy-benzaldehyde-4-arsonic acid in 40 ccm. of water, and the whole is heated on the steam bath for 10 minutes. The mass is then cooled, the resulting semicarbazone-arsonic acid is precipitated by means of hydrochloric acid, filtered by suction and washed with water. It has the following formula:

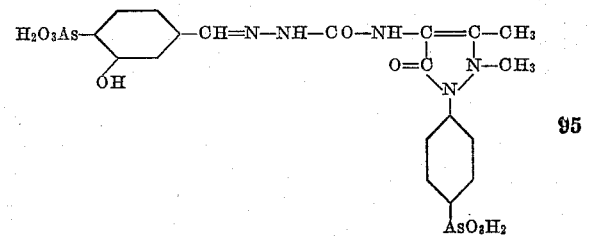

The preparations obtained according to

Example 1 and 2 yield with alkalies, ammonia and organic bases water-soluble salts.

We claim:

1. As new products, the compounds of the following formula:

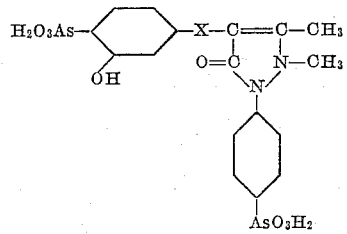

wherein X stands for one of the groups -CH=N- and -CH=N-NH-CO-NH-, said products having a good curative power and a slight poisonousness.

2. As a new product, the compound of the following formula:

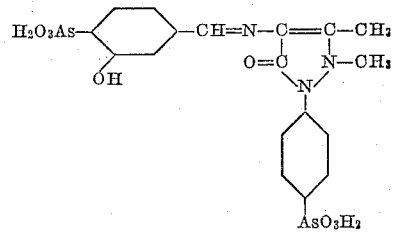

possessing a good curative power and a slight poisonousness.

3. As a new product, the compound of the following formula:

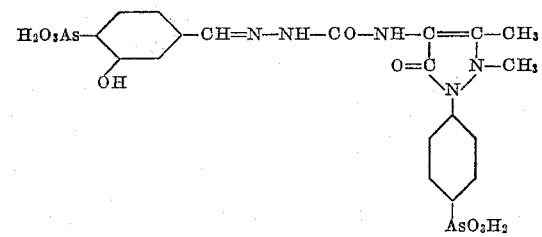

possessing a good curative power and a slight poisonousness.

In testimony whereof, we affix our signatures.

KARL STREITWOLF.
ALFRED FEHRLE.
WALTER HERRMANN.
PAUL FRITZSCHE.